H. FELDMEIER.
APPARATUS FOR PASTEURIZING MILK.
APPLICATION FILED JAN. 28, 1910.
972,608. Patented Oct. 11, 1910.
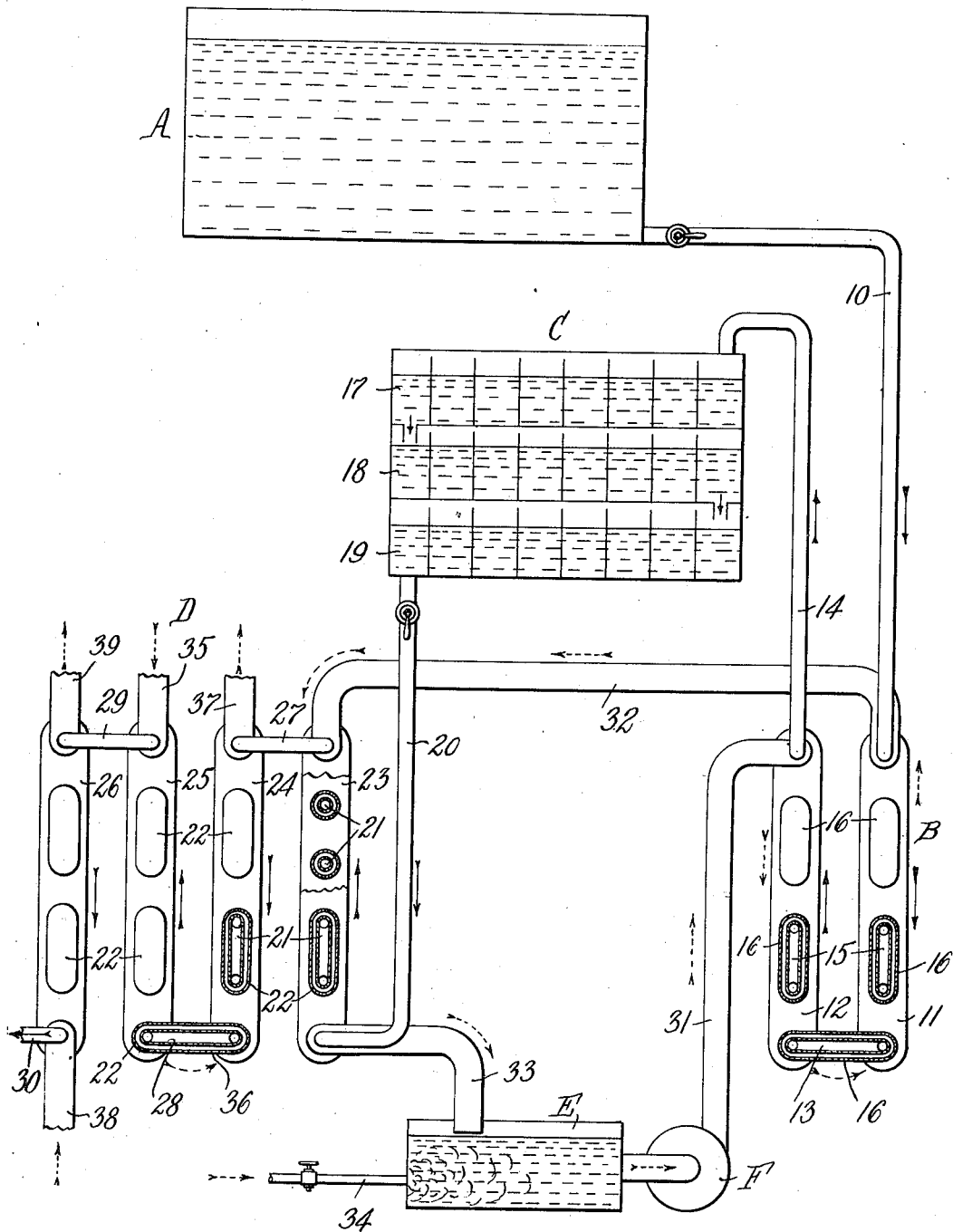

UNITED STATES PATENT OFFICE.

HARVEY FELDMEIER, OF LITTLE FALLS, NEW YORK, ASSIGNOR TO D. H. BURRELL & COMPANY, OF LITTLE FALLS, NEW YORK.

APPARATUS FOR PASTEURIZING MILK.

972,608.

Specification of Letters Patent.

Patented Oct. 11, 1910.

Application filed January 28, 1910. Serial No. 540,677.

*To all whom it may concern:*

Be it known that I, HARVEY FELDMEIER, a citizen of the United States, residing at Little Falls, in the county of Herkimer and State of New York, have invented a new and useful Improvement in Apparatus for Pasteuring Milk, of which the following is a specification.

This invention relates to the pasteurization of milk, milk derivatives and other liquids by heating the milk or other liquid to the required temperature while flowing in a stream or current, subjecting the liquid to the heat for a sufficient length of time to produce the desired effect upon the bacteria, germs, organisms or substances contained in the liquid which are to be destroyed, modified or rendered inocuous, and then cooling the liquid, while flowing in a stream or current, to the temperature at which it can be put in bottles, cans or other receptacles.

The object of this invention is to provide an apparatus by which these operations can be carried on in a simple, economical and effective manner.

The accompanying drawing is a diagrammatic elevation of an apparatus which embodies this invention.

A represents a receptacle for raw milk or other liquid to be pasteurized, and 10 a pipe through which the milk flows from said receptacle to the heater B which may be constructed for convenience in several sections, for instance, in two sections 11 and 12, as shown. The section 11 receives the raw milk from the pipe 10 at its upper end and is connected at its lower end with the lower end of the section 12 by a pipe 13. The heated milk is discharged from the upper end of the section 12 by a pipe 14.

The heater is preferably of the style in which the milk flows through an inner tube 15 which is surrounded by an outer tube 16, separated from the inner tube by an annular space through which the heating fluid, for instance, hot water, flows in a direction opposite to that of the milk.

The heated milk which has been heated in the heater to the pasteurizing temperature flows from the outlet end of the heater to a holding apparatus C in which the milk is retained for a sufficient length of time at the pasteurizing temperature to produce the desired pasteurizing effect, which, as is well understood, depends upon the temperature to which the milk is heated and the length of time during which the milk is kept at such temperature. For illustration, if the milk is heated to a temperature of about 158° F. an efficient pasteurization is effected in about three minutes, while if the milk is heated to about 140° F. it should be kept at this temperature for about twenty minutes.

The holding apparatus C may be of any suitable construction which enables the liquid to be subjected to the heat for the necessary length of time, but is preferably so constructed that the milk remains in motion while being retained in the same and occupies the necessary period of time in flowing through the same.

The holding apparatus shown in the drawing comprises three sections 17, 18 and 19, arranged one above the other. The hot milk is delivered by the pipe 14 to the uppermost section 17 at one end thereof and flows successively through the sections, which are each provided with partitions forming a sinuous channel for the milk. The latter escapes from the lowermost section 19 through a pipe 20 which conducts the milk to the cooler D by which the hot milk is cooled to the temperature at which the milk is put in cans, bottles or other receptacles.

The cooler D, like the heater B, is preferably of the internal tube type, comprising an inner tube 21 for the milk and an outer tube 22 which forms a flow passage for the cooling fluid around the milk pipe. The cooler shown in the drawings is made up of several sections through which the milk flows successively, an initial or regenerative section 23, two intermediate sections 24, 25, and a final section 26. The initial or regenerative section 23 receives the hot milk from the holding apparatus at its lower end by the pipe 20 and delivers the partially cooled milk at its upper end by a pipe 27 to the upper end of the first intermediate section 24. The milk passes from the lower end of the latter by a pipe 28 to the lower end of the second intermediate section 25 and from the upper end of the latter by a pipe 29 to the upper end of the final section 26, from the lower end of which the cooled milk escapes by a pipe 30.

The course of the milk or other liquid to be pasteurized through the apparatus is indicated by arrows drawn in full lines and the course of the heating and cooling fluids by arrows in dotted lines.

The hot water by which the milk is heated in flowing through the heater B is contained in a regenerative endless circulating system in which the hot water, after flowing through the heater and becoming cooled therein by the raw milk, is brought under the influence of the heated milk which has completed the pasteurizing period and is reheated by the hot milk as far as practicable, while the latter is correspondingly cooled. The comparatively cool return water from the heater is in this manner used for cooling the heated milk and the latter is used for partially reheating the return water, thereby recovering a portion of the heat contained in the heated milk, and the circulating water is then raised to the required high temperature by supplying heat to the water before the latter enters the heater.

E represents a tank, hot well or other receptacle from which the hot water is supplied by a pipe 31 to the upper end of the section 12 of the heater B, and F represents a pump by which the circulation is maintained through the regenerative system.

32 represents the return pipe through which the water flows from the upper end of the section 11 of the heater to the upper end of the initial section 23 of the cooler, and 33 the pipe through which the water flows from the cooler to the tank E. The latter is provided with a steam pipe 34 by which steam is injected into the water in the tank for raising the temperature of the same to the required point before the water reaches the heater. A heating coil may be used instead of steam injection, and if desired, the tank or hot well may be omitted and the heating medium injected into or applied to the pipe or conduit through which the water flows to the heater.

The hot water for heating the milk in the heater B is heated to the required temperature, preferably about 160° F., and parts with a portion of its heat to the cold raw milk in passing through the heater. The hot water therefore escapes from the heater at a considerably reduced temperature, approximately from about 70° to 80° F., while the raw milk, which enters the heater at a temperature of about 60° F., is raised in passing through the heater to the desired temperature, preferably from about 140° to 158° F., which temperature the milk retains with slight loss in passing through the holder C and from the latter to the initial section 23 of the cooler. In passing through this section the hot milk parts with a portion of its heat to the return water from the heater, which enters the cooler at a temperature approximately of from 50° to 60° F. and is heated by the hot milk to a temperature approximately of from 110° to 120° F., while the milk is cooled to a temperature of from 80° to 90° F. The milk is then further cooled in the succeeding sections of the cooler. As shown, the intermediate sections 24 and 25 are provided with a conduit for spring water, which enters the upper end of the second section at 35, passes from the lower end of this section by a pipe 36 to the lower end of the section 24, and has its outlet 37 at the upper end of that section, while the final section 26 is provided with a conduit for brine which has its inlet 38 at the lower end of the section and its outlet 39 at the upper end.

The apparatus herein described is particularly desirable for the treatment of milk and it should be understood that this term, as used herein, is intended to include not only full milk but also milk derivatives; for instance, cream, skimmilk and buttermilk.

The apparatus is also applicable to the pasteurization of other liquids.

I claim as my invention:

1. A pasteurizing apparatus comprising an endless regenerative system in which a temperature-changing fluid acts upon the liquid to be pasteurized alternately as a heating and a cooling medium, said fluid being hotter than the incoming cold liquid and serving to heat the same and becoming cooled thereby, and said cooled fluid being then cooler than the outgoing hot liquid and serving to cool the same and becoming heated thereby, and said system being provided with means for supplying additional heat to the temperature-changing fluid before the latter acts upon the liquid to be heated, substantially as set forth.

2. The combination of a heater for the liquid to be pasteurized, a cooler for the heated liquid, an endless regenerative circulating passage for a temperature-changing fluid, which passage includes said heater and said cooler and in which said fluid circulates, and means for supplying additional heat to said fluid after leaving said cooler and before entering said heater, substantially as set forth.

3. The combination of a heater for the liquid to be pasteurized, a cooler for the heated liquid, a holder for the heated liquid interposed between the heater and cooler, an endless regenerative circulating passage for a temperature-changing fluid, which passage includes said heater and cooler, and means for supplying additional heat to said fluid before entering said heater, substantially as set forth.

4. The combination of a heater for the liquid to be pasteurized, a cooler for the heated liquid, a holder for the heated liquid interposed between the heater and the cooler, an endless regenerative circulating passage for a temperature-changing fluid, which passage includes said heater and said cooler in which said fluid circulates, and means for supplying additional heat to said fluid before entering said heater, substantially as set forth.

5. An apparatus for pasteurizing a liquid comprising a regenerative system in which a temperature-changing fluid which is colder than the hot liquid acts upon the outgoing hot liquid to cool the same and becomes heated thereby and in which the fluid thus heated serves to heat the incoming cold liquid, and means for increasing the temperature of the fluid thus partially heated to a temperature higher than that of the hot liquid, substantially as set forth.

Witness my hand in the presence of two subscribing witnesses.

HARVEY FELDMEIER.

Witnesses:
GRIFFITH PRICHARD,
D. EVERETT FREEMAN.